(12) United States Patent
Manwaring et al.

(10) Patent No.: US 7,325,834 B2
(45) Date of Patent: Feb. 5, 2008

(54) ADAPTIVE STRAP ENERGY ABSORBER WITH PIN PULLER

(75) Inventors: Marvin V. Manwaring, Clio, MI (US); Richard K. Riefe, Saginaw, MI (US); Ray G. Armstrong, Bay City, MI (US); Lee M. Tinnin, Clio, MI (US); Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 357 days.

(21) Appl. No.: 10/914,930

(22) Filed: Aug. 10, 2004

(65) Prior Publication Data

US 2006/0033321 A1    Feb. 16, 2006

(51) Int. Cl.
*B62D 1/18* (2006.01)
(52) U.S. Cl. .................................... 280/777
(58) Field of Classification Search ............ 280/777; B62D 1/19
See application file for complete search history.

(56) References Cited

U.S. PATENT DOCUMENTS

| | | | |
|---|---|---|---|
| 4,630,716 A * | 12/1986 | Faust ......................... 188/371 |
| 4,901,592 A * | 2/1990 | Ito et al. ...................... 74/492 |
| 4,989,898 A * | 2/1991 | Yamaguchi et al. ......... 280/777 |
| 5,375,881 A * | 12/1994 | Lewis ........................ 280/777 |
| 5,517,877 A * | 5/1996 | Hancock ...................... 74/492 |
| 5,562,307 A * | 10/1996 | Connor ....................... 280/777 |
| 5,692,778 A | 12/1997 | Cymbal |
| 5,706,704 A * | 1/1998 | Riefe et al. ................... 74/493 |
| 5,788,278 A * | 8/1998 | Thomas et al. ............. 280/777 |
| 6,170,874 B1 | 1/2001 | Fosse |
| 6,189,929 B1 | 2/2001 | Struble et al. |
| 6,322,103 B1 | 11/2001 | Li et al. |
| 6,394,241 B1 | 5/2002 | Desjardins et al. |
| 6,419,269 B1 * | 7/2002 | Manwaring et al. ........ 280/775 |
| 6,478,333 B1 * | 11/2002 | Barton et al. ............... 280/777 |
| 6,641,167 B2 | 11/2003 | Riefe et al. |
| 6,652,002 B2 | 11/2003 | Li et al. |
| 6,659,504 B2 * | 12/2003 | Riefe et al. ................. 280/777 |
| 6,749,221 B2 | 6/2004 | Li |
| 6,749,222 B2 * | 6/2004 | Manwaring et al. ........ 280/777 |
| 6,764,098 B2 * | 7/2004 | Matsumoto et al. ........ 280/777 |
| 2002/0036404 A1* | 3/2002 | Li et al. ..................... 280/777 |
| 2003/0071451 A1* | 4/2003 | Riefe et al. ................. 280/777 |
| 2003/0102658 A1* | 6/2003 | McCarthy et al. .......... 280/777 |
| 2004/0232685 A1* | 11/2004 | Gatti et al. ................. 280/777 |
| 2006/0049621 A1* | 3/2006 | Lee ............................ 280/777 |

* cited by examiner

*Primary Examiner*—Paul N. Dickson
*Assistant Examiner*—Leonard McCreary, Jr.
(74) *Attorney, Agent, or Firm*—Michael D. Smith

(57) ABSTRACT

An apparatus and method of operation dissipates energy associated with the telescopic collapse of preferably two steering column members. The first and second steering column members are moveable relative to one another along a collapse path. At least one anvil is fixed with one of the first and second steering column members. A strap extends along a bent path around the at least one anvil to first and second free ends. The apparatus also includes a lock device operative in a first condition to restrain the first free end with respect to the first steering column member and in a second condition to release the first free end of the strap.

27 Claims, 4 Drawing Sheets

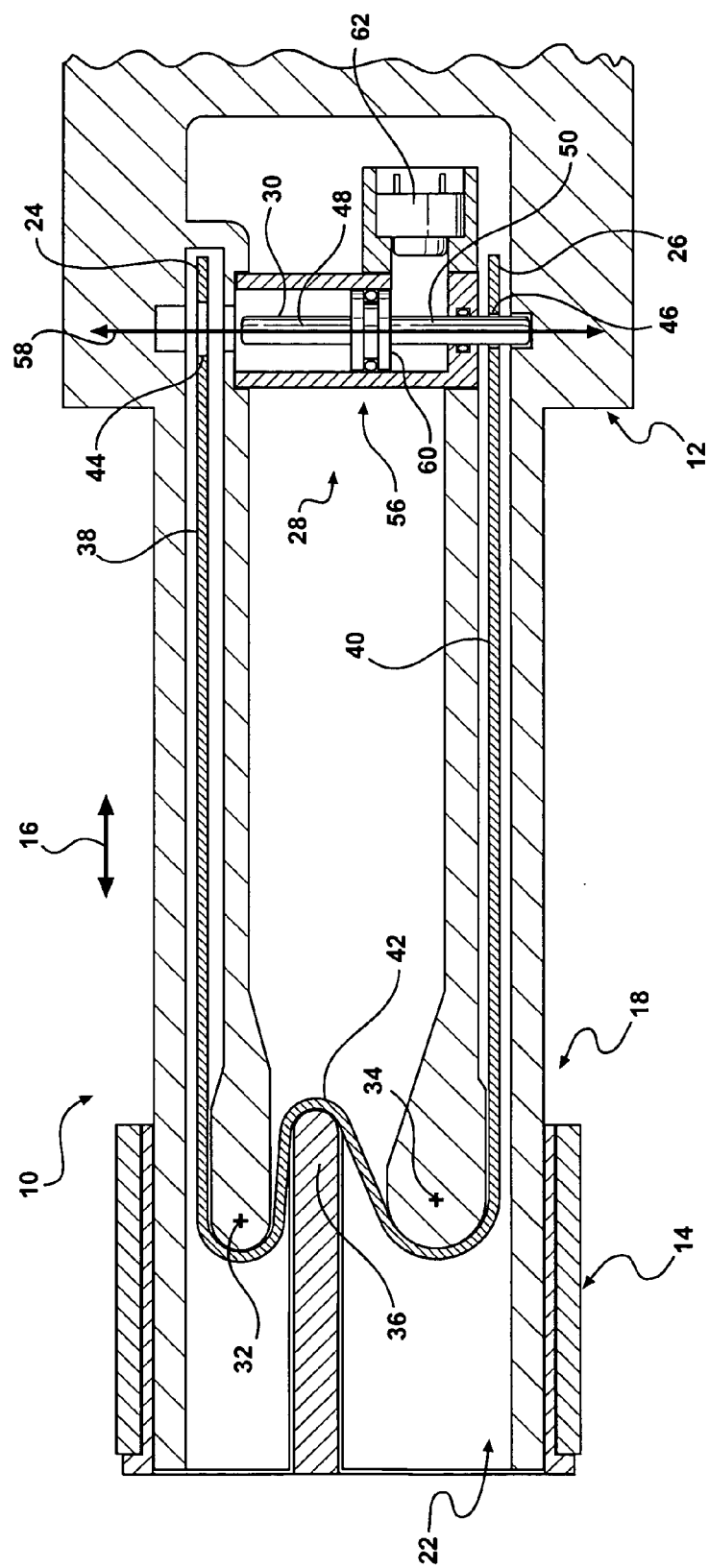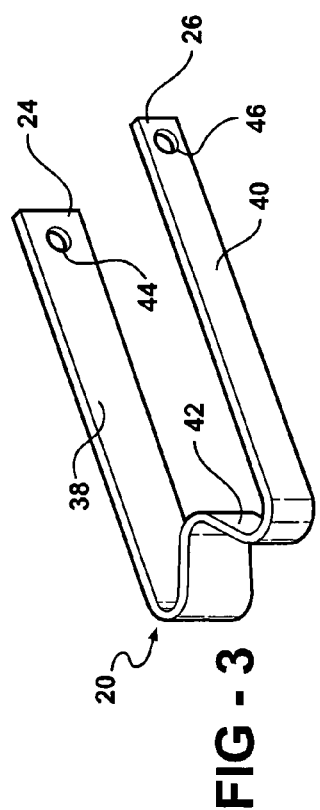

ADAPTIVE STRAP ENERGY ABSORBER WITH PIN PULLER

FIELD OF THE INVENTION

The invention relates to energy dissipation in response to relative movement between two members and more particularly to a system including an anvil and strap wherein the strap is drawable over the anvil in response to telescopic collapse.

BACKGROUND OF THE INVENTION

Steering column assemblies for vehicles often include kinetic energy absorption devices that act to control the collapse of the column in the event of a crash to reduce the likelihood of injury to the driver. One form of an energy absorbing device comprises a metal strap that is bent and drawn over an anvil to absorb kinetic energy of a collapsing column. Examples of this type of energy absorbing device include U.S. Pat. Nos. 6,170,874; 6,189,929; 6,322,103; and 6,652,002. The rate of energy dissipation can be adjusted, as shown in U.S. Pat. Nos. 6,749,221; 6,652,002; and 6,641,167.

SUMMARY OF THE INVENTION AND ADVANTAGES

The invention provides a method an apparatus for dissipating energy associated with the telescopic collapse of two members, such as steering column members. The apparatus according to the invention includes first and second steering column members moveable relative to one another along a collapse path. At least one anvil is fixedly associated with one of said first and second steering column members. A strap extends along a bent path around the at least one anvil and includes first and second free ends. The apparatus also includes a lock device operative in a first condition to restrain one of the first and second free ends of said strap with respect to one of the first and second steering column members. The lock device is also operative in a second condition to release said one of said first and second free ends of said strap.

The method according to the invention includes the step of moving the first and second steering column members relative to one another along the collapse path. The method also includes the step of fixedly associating at least one anvil with one of the first and second steering column members. The method also includes the step of extending a strap having first and second free ends along a bent path around the at least one anvil. The method also includes the step of locking one of the first and second ends of the strap with respect to one of the first and second steering column members with a lock device operative in a first condition to restrain one of the first and second free ends of the strap with respect to one of the first and second steering column members and operative in a second condition to release the one of the first and second free ends of the strap.

The exemplary embodiments of the invention allow adjustable energy absorption in a vehicle steering column. Sensors can be disposed in the vehicle to sense the conditions that affect the amount of energy to be absorbed in a vehicle crash such as the driver's weight, the vehicle's speed, and the proximity of the driver to the steering wheel of the vehicle. The sensors communicate with a controller that controls the lock device that is associated with the strap. In a first embodiment of the invention, the lock device can selectively lock either end of an M-shaped strap to control movement of the strap in one of two directions over a plurality of anvils. The rate of energy dissipation would be different in either direction due to the configuration of the strap, the respective configurations of the anvils, and/or the positions of the anvils with respect to one another.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is cross-sectional view of the first embodiment of the invention taken along section lines 2-2 in FIG. 1;

FIG. 3 is a perspective view of a strap of the first embodiment of the invention;

DETAILED DESCRIPTION OF THE PREFERRED EMBODIMENT

Figure 1:
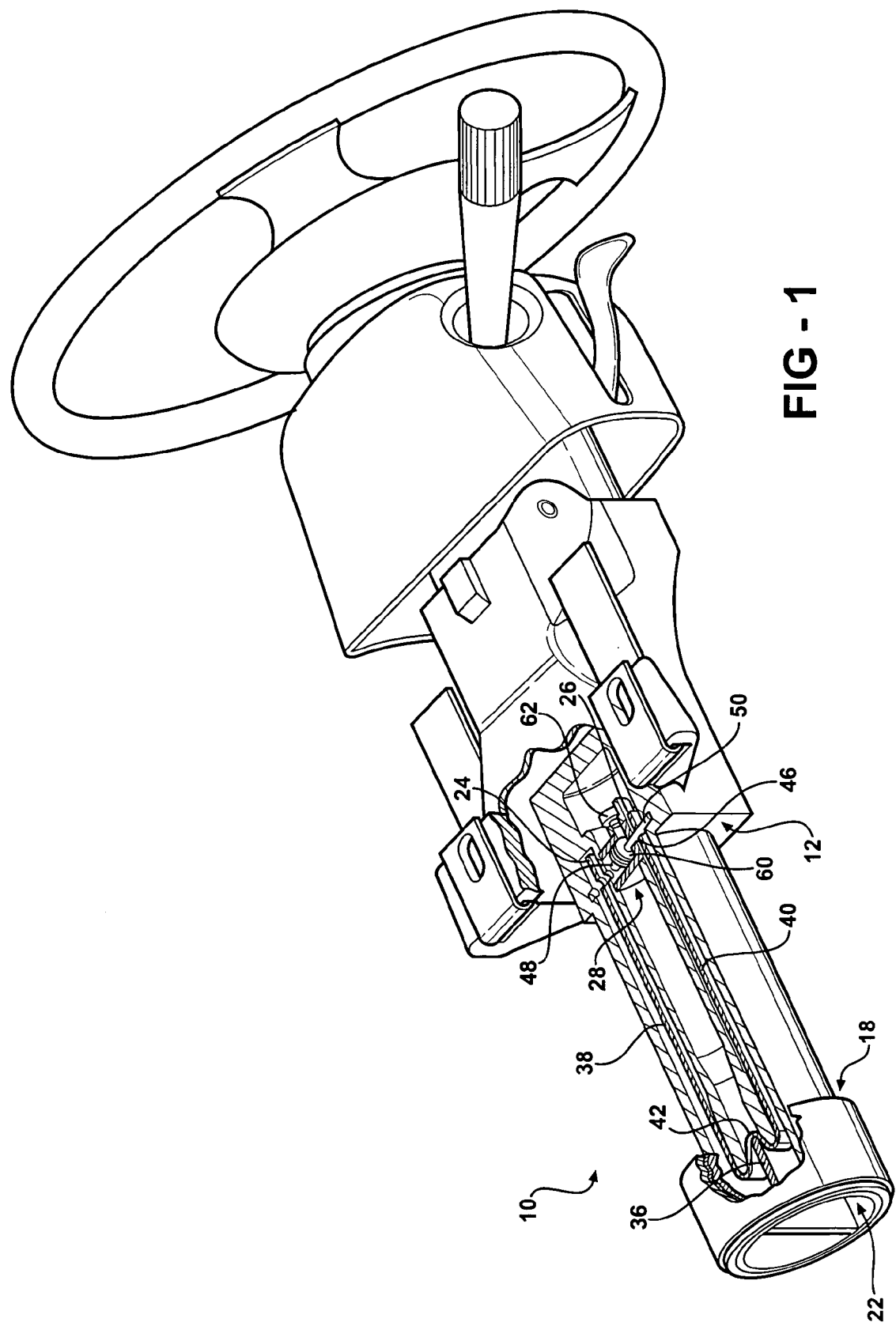
FIG. 1 is a perspective cross-sectional view of a first embodiment of the invention.

A plurality of different embodiments of the invention are shown in the Figures of the application. Similar features are shown in the various embodiments of the invention. Similar features have been numbered with a common two-digit reference numeral and have been differentiated by a third digit placed before the two common digits. Similar features are structured similarly, operate similarly, and/or have the same function unless otherwise indicated by the drawings or by this specification. Furthermore, particular features of one embodiment can replace corresponding features in another embodiment unless otherwise indicated by the drawings or this specification.

Referring now to FIGS. 1 and 2, in a first exemplary embodiment, the invention provides an apparatus 10 including first and second steering column members 12, 14 moveable relative to one another along a collapse path 16. The first and second steering column members 12, 14 are telescoping upper and lower steering column jackets in the first exemplary embodiment of the invention. However, one or both of the first and second steering column members 12, 14 can be brackets or any structures of a steering column.

The apparatus 10 also includes at least one anvil 18 fixedly associated with one of said first and second steering column members 12, 14 and a strap 20 extending along a bent path 22 around the at least one anvil 18. The strap 20 includes first and second free ends 24, 26 and is drawable over the at least one anvil 18 during movement along the bent path 22. The strap 20 moves along the bent path 22 in response to movement of the first and second steering column members 12, 14 relative to one another along the collapse path 16.

In the first exemplary embodiment of the invention, the at least one anvil 18 includes first and second anvils 32, 34 fixedly associated with said first steering column member 12 and a third anvil 36 fixedly associated with said second steering column member 14. the strap 20 defines the bent path 22; the bent path 22 extending between the first and second free ends 24, 26 around the first, second and third anvils 32, 34, 36.

The anvils 32, 34, 36 can be variably positioned with respect to one another to adjust the rate of energy dissipation. For example, in the first exemplary embodiment of the invention, the third anvil 36 is spaced closer to the first anvil 32 than the second anvil 34. As a result, the severity of the angles defined by the bent path 22 between the first and third anvils 32, 36 is greater than the severity of the angles defined by the bent path 22 between the second and third anvils 34, 36.

The strap 20 is M-shaped, including a first leg 38, a second leg 40 and an intermediate portion 42. The first free end 24 is defined by said first leg 38 and the second free end 26 is defined by said second leg 40. As best shown in FIG. 3, the first and second legs 38, 40 of the M-shaped strap 20 are sized differently with respect to one another. For example, the first leg 38 is wider than the second leg 40. As a result, a relatively greater amount of energy would be dissipated when the first leg 38 is drawn over the first, second and third anvils 32, 34, 36 than when the second leg 40 is drawn over the first, second and third anvils 32, 34, 36.

The apparatus 10 also includes a lock device 28 operative in a first condition to restrain one of the first and second free ends 24, 26 of the strap 20 with respect to one of said first and second steering column members 12, 14 and operative in a second condition to release the one restrained free ends 24, 26 of the strap 20. The unrestrained end 24, 26 is moveable relative to both of said first and second steering column members 12, 14. In the first exemplary embodiment of the invention, the lock device 28 is disposed between said first and second legs 38, 40 of the M-shaped strap 20 and can engage either of the first or second ends 24, 26 and prevent movement of the engaged end 24, 26 with respect to the first steering column member 12.

As a result, the strap 20 can be moved in one of two directions along the bent path 22 in response to movement of the first and second steering column members 12, 14 relative to one another along the collapse path 16. For example, if the lock device 28 engages the first end 24, the strap 20 will move in a first direction along the bent path 22 in response to movement of the first and second steering column members 12, 14 relative to one another along the collapse path 16 such that the second leg 40 is drawn over the first, second and third anvils 32, 34, 36. Alternatively, if the lock device 28 engages the second end 26, the strap 20 will move in a second direction along the bent path 22 in response to movement of the first and second steering column members 12, 14 relative to one another along the collapse path 16 such that the first leg 38 is drawn over the first, second and third anvils 32, 34, 36. The first and second directions are opposite one another.

Furthermore, the rate of energy dissipation can be different based on the direction of movement of the strap 20 along the bent path 22. For example, in the first exemplary embodiment of the invention, the rate of energy dissipation during movement in the second direction will be greater than the rate of energy dissipation during movement in the first direction since, in part, the first leg 38 is wider than the second leg 40 and also, in part, the first and third anvils 32, 36 are closer to one another than the second and third anvils 34, 36.

In one aspect of the first exemplary embodiment of the invention, the lock device 28 includes a surface 30 moveable to a locked position when the lock device 28 is operating in the first condition and to an unlocked position when the lock device 28 is operating in the second condition. The surface 30 contacts the strap 20 while in the locked position and is spaced from the strap 20 while in the unlocked position. In the first exemplary embodiment of the invention, the strap 20 includes a first aperture 44 disposed at the first free end 24 and a second aperture 46 disposed at said second free end 26. The lock device 28 includes a first tip 48 selectively insertable in the first aperture 44 and a second tip 50 selectively insertable in the second aperture 46. The surface 30 is defined by the first tip 48 and is engageable with the aperture 44. The second tip 50 defines a second surface engageable with the aperture 46.

In another aspect of the first exemplary embodiment of the invention, the lock device 28 includes a portion 56 moveable along a locking path 58 between a first position wherein the first free end 24 of the strap 20 is locked with respect to one of the first and second steering column members 12, 14 and a second position wherein the first free end 24 is unlocked with respect to said one of the first and second steering column members 12, 14. The portion 56 defines the first and second tips 48, 50 to lock one of the first and second ends 24, 26 with respect to the first steering column member 12.

The portion 56 includes a follower surface 60 and the lock device 28 includes an explosive charge 62 in communication with the follower surface 60. The explosive charge 62 is disposed internally with respect to the first steering column member 12. The follower surface 60 is disposed between said first and second tips 48, 50. The explosive charge 62 is operable to explode adjacent to the follower surface 60 to move the portion 56 along the locking path 58. In the first exemplary embodiment of the invention, the portion 56 is positioned such that the lock device 28 is operating in the second condition, the tip 50 piercing the aperture 46 and the second end 26 immovably associated with the first steering column member 12. When the explosive charge 62 is fired, the explosion acts on the surface 60 and urges the portion 56 toward the first end 24. The first pin 48 pierces the aperture 44 to immovably associate the first end 24 with the first steering column member 12. The second pin 50 withdraws from the aperture 46 and the apparatus 10 will dissipate energy at a relatively lesser rate. The explosive charge 62 and portion 56 could be arranged such that the rate of energy dissipation increases after the explosive charge 62 has fired.

In other aspects of the first exemplary embodiment of the invention, the locking path 58 extends at least partially perpendicular to said strap 20. Also, the locking path 58 extends at least partially perpendicular to the collapse path 16. The locking path 58 could extend transverse to either the strap 20 or the collapse path 16 or both.

In another aspect of the first exemplary embodiment of the invention, the bent path 22 changes in response to movement between said first and second steering column members 12, 14 along the collapse path 16. As the first and second steering column members 12, 14 collapse, the length of the intermediate portion 42 increases while the size of at least one of the first and second legs 38, 40 decreases. For example, if the lock device 28 is engaging the first free end 24 during collapse, the length of the second leg 40 will decrease as the length of the intermediate portion 42 increases. Alternatively, if the lock device 28 is engaging the second free end 26 during collapse, the length of the first leg 38 will decrease as the length of the intermediate portion 42 increases.

In operation of the first exemplary embodiment of the invention, sensors in the vehicle can be disposed to sense conditions that affect the impacting force associated with the driver striking the steering wheel. The sensors can sense, among other things, the vehicle speed, the weight of the driver, the proximity of the driver to the steering wheel, and the force acting against the steering wheel. The sensors communicate with a controller and the controller can perform logic operations in response to the signals received from the sensors. As a result of the logic operations, the controller may fire the explosive charge 62. For example, if the force acting against the steering wheel is relatively high, the explosive charge 62 may not be fired and the first leg 38 of the M-shaped strap 20 would be drawn over the anvils 32, 36 in response to movement between the first and second steering column members 12, 14 along the collapse path 16 while the second end 26 is fixedly associated with the first steering column member 12. Alternatively, if the force acting against the steering wheel is relatively low, the explosive charge 62 may be fired and the second leg 40 of the M-shaped strap 20 would be drawn over the anvils 34, 36 in response to movement between the first and second steering column members 12, 14 along the collapse path 16 while the first end 24 is fixedly associated with the first steering column member 12.

Figure 4:
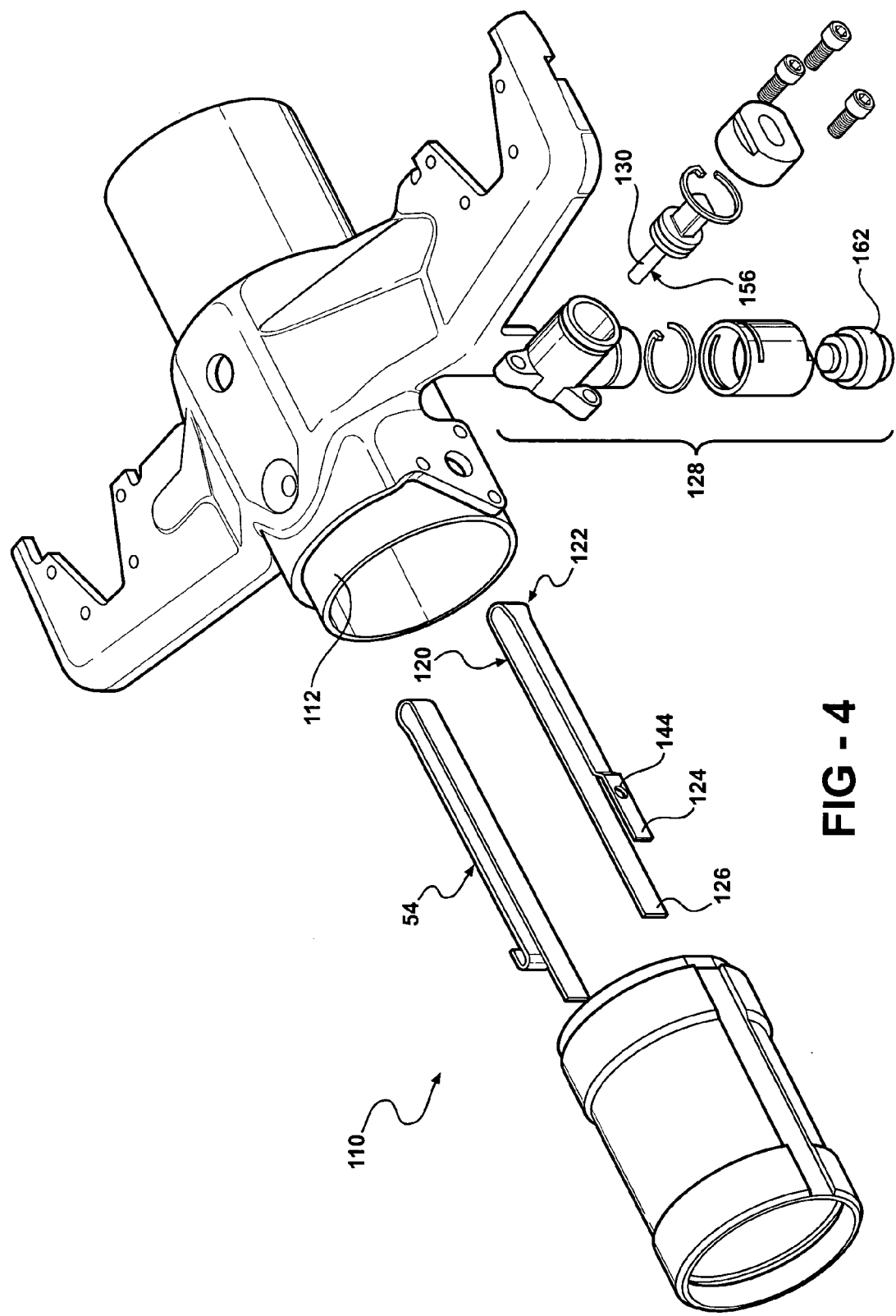
FIG. 4 an exploded view of a second embodiment of the invention.
Figure 5:
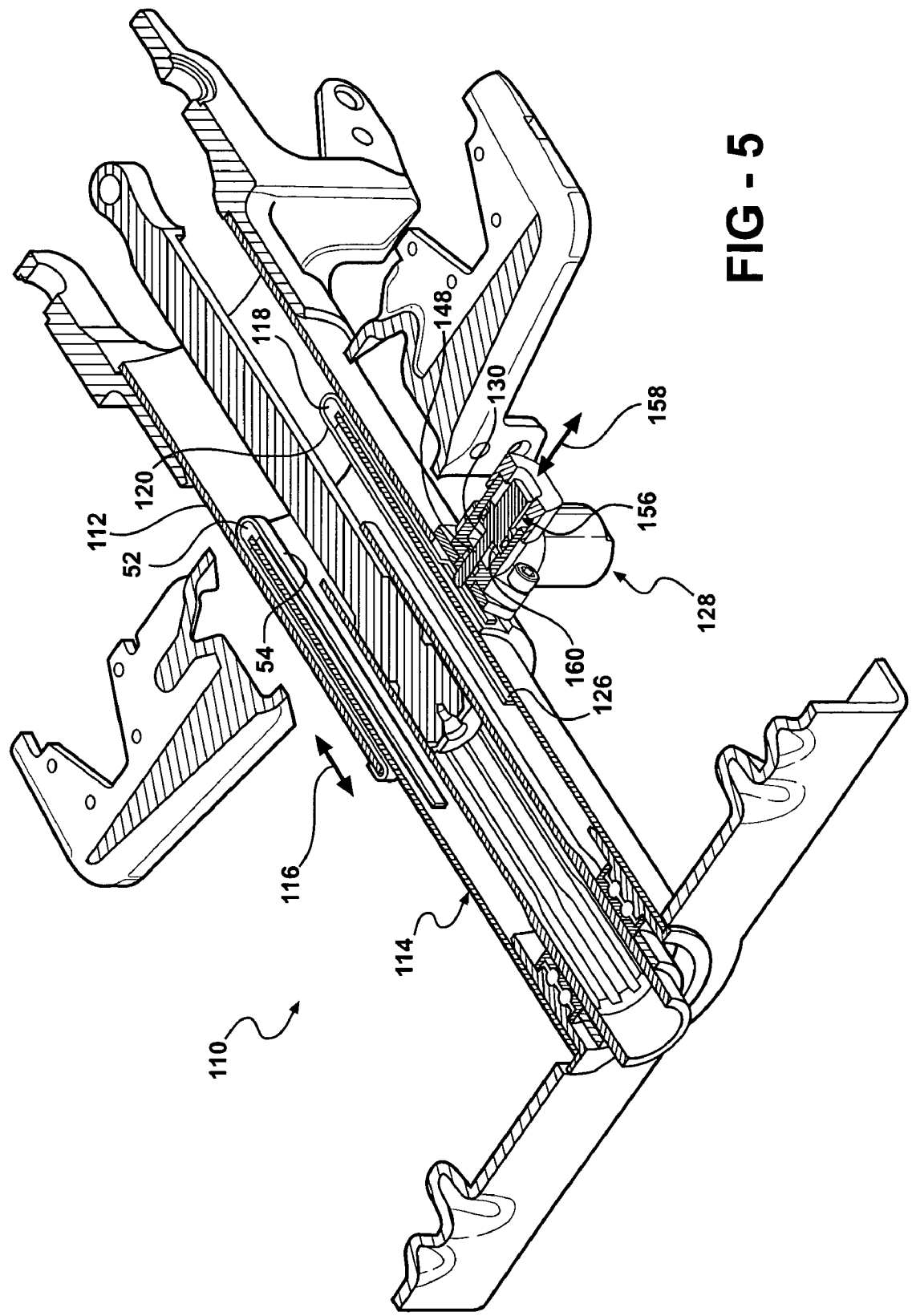
FIG. 5 is perspective cross-sectional view of the second embodiment of the invention corresponding to the view shown in FIG. 4.

Referring now to FIGS. 4 and 5, in a second exemplary embodiment, the invention provides an apparatus 110 including first and second steering column members 112, 114 moveable relative to one another along a collapse path 116. The first and second steering column members 112, 114 are telescoping upper and lower steering column jackets in the second exemplary embodiment of the invention. However, one or both of the first and second steering column members 112, 114 can be brackets or any structures of a steering column.

The apparatus 110 also includes at least one anvil 118 fixedly associated with one of said first and second steering column members 112, 114 and a strap 120 extending along a bent path 122 around the at least one anvil 118. The strap 120 includes first and second free ends 124, 126 and is drawable over the at least one anvil 118 during movement along the bent path 122.

The apparatus 110 also includes a lock device 128 operative in a first condition to restrain one of the first and second free ends 124, 126 of the strap 120 with respect to one of said first and second steering column members 112, 114 and operative in a second condition to release the one restrained free ends 124, 126 of the strap 120. The unrestrained end 124, 126 is moveable relative to both of said first and second steering column members 112, 114. In the second exemplary embodiment of the invention, the lock device 128 selectively engages the first end 124 to immovably associate the first end 124 with respect to the first steering column member 112.

As a result, the at least one anvil 118 and the strap 120 are selectively engageable with one another. In other words, the strap 120 can be drawn over the at least one anvil 118 in response to movement of the first and second steering column members 112, 114 relative to one another along the collapse path 116 when the lock device 128 is operating in the first condition. Alternatively, the strap 120 and at least one anvil 118 can remain substantially fixedly positioned with respect to one another during movement of the first and second steering column members 112, 114 relative to one another along the collapse path 116 when the lock device 128 is operating in the second condition.

In one aspect of the second exemplary embodiment of the invention, the lock device 128 includes a surface 130 moveable to a locked position when the lock device 128 is operating in the first condition and to an unlocked position when the lock device 128 is operating in the second condition. The surface 130 contacts the strap 120 while in the locked position and is spaced from the strap 120 while in the unlocked position. The surface 130 is defined by a first tip 148 and is engageable with an aperture 44 defined by the first end 124.

In another aspect of the second exemplary embodiment of the invention, the lock device 128 includes a portion 156 moveable along a locking path 158 between a first position wherein the first free end 124 of the strap 120 is locked with respect to one of the first and second steering column members 112, 114 and a second position wherein the first free end 124 is unlocked with respect to said one of the first and second steering column members 112, 114. The portion 156 defines the first tip 148 to lock the first end 124 with respect to the first steering column member 112.

The portion 156 includes a follower surface 160 and the lock device 128 includes an explosive charge 162 in communication with the follower surface 160. The explosive charge 162 is operable to explode adjacent to the follower surface 160 to move the portion 156 along the locking path 158. The explosive charge 162 is disposed externally with respect to both of the first and second steering column members 112, 114. In the second exemplary embodiment of the invention, the portion 156 is positioned such that the lock device 28 is operating in the first condition, the tip 148 piercing the aperture 144 and the first end 124 immovably associated with the first steering column member 112. When the explosive charge 162 is fired, the explosion acts on the surface 160 and urges the portion 156 away from the first end 124. The pin 148 withdraws from the aperture 144 and the apparatus 110 will dissipate energy at a relatively lesser rate. The explosive charge 62 and portion 56 could be arranged such that the rate of energy dissipation increases after the explosive charge 62 has fired.

In other aspects of the second exemplary embodiment of the invention, the locking path 158 extends at least partially perpendicular to said strap 120. Also, the locking path 158 extends at least partially perpendicular to the collapse path 116. The locking path 158 could extend transverse to either the strap 120 or the collapse path 116 or both.

The second embodiment of the invention includes an anvil 52 fixedly associated with the second steering column member 114 and a second strap 54 fixedly associated with the first steering column member 112. The second strap 54 extends around the anvil 52 and is drawn over the anvil 53 in response to relative movement between the first and second steering column members 112, 114 along the collapse path 116. The second strap 54 is operatively disposed in parallel to said strap 120. In other words, when the lock device 128 is operating in the first condition and the first end 124 is immovably associated with the first steering column member 112, the straps 120, 54 are concurrently drawn over the anvils 118, 52, respectively. The straps 120, 54 can be configured differently with respect to one another. For example, the straps 120, 54 can be sized differently with respect to one another such that the one of the straps 120, 54 is wider than the other.

In operation of the second exemplary embodiment of the invention, sensors in the vehicle can be disposed to sense conditions that affect the impacting force associated with the driver striking the steering wheel. The sensors can sense, among other things, the vehicle speed, the weight of the driver, the proximity of the driver to the steering wheel, and the force acting against the steering wheel. The sensors communicate with a controller and the controller can perform logic operations in response to the signals received from the sensors. As a result of the logic operations, the controller may fire the explosive charge 162. For example, if the force acting against the steering wheel is relatively high, the explosive charge 162 may not be fired and the first end 124 of the strap 120 would fixedly associated with the first steering column member 112 and drawn over the anvil 118 in response to movement between the first and second steering column members 112, 114 along the collapse path 116. Alternatively, if the force acting against the steering wheel is relatively low, the explosive charge 162 may be fired and the first end 124 of the strap 120 would disassociated with the first steering column member 112 and not drawn over the anvil 118 in response to movement between the first and second steering column members 112, 114 along the collapse path 116.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An energy absorbing apparatus comprising:
    first and second steering column members being telescopically movable relative to one another along a collapse path;
    a first anvil caffied by said second steering column member;
    a strap extending around said first anvil and having first and second free ends;
    a lock device operative in a first condition to restrain said first free end with respect to said first steering column member and operative in a second condition to release said first free end in response to a pre-determined impact load condition during a vehicle collision; and
    wherein the second free end is movable relative to both of said first and second steering column members at least when said lock device is in said first condition.

2. The apparatus of claim 1 wherein said lock device includes a surface moveable to a locked position when said lock device is in said first condition and to an unlocked position when said lock device is in said second condition, wherein said surface contacts said strap in said locked position and is spaced from said strap in said unlocked position, and wherein said lock device is engaged to and supported by the first steering column member.

3. The apparatus of claim 1 further comprising a second anvil fixed to one of said first and second steering column members, and wherein said strap extends around said second anvil.

4. The apparatus of claim 3 wherein said second anvil is fixed to said first steering column member and a third anvil is fixed to said second steering column member.

5. The apparatus of claim 1 wherein said strap is M-shaped, including a first leg, a second leg and an intermediate portion, wherein said first free end is defined by said first leg and said second free end is defined by said second leg.

6. The apparatus of claim 5 wherein said first and second legs of said M-shaped strap are sized differently with respect to one another.

7. The apparatus of claim 6 wherein one of said first and second legs of said M-shaped strap is wider than the other of said first and second legs of said M-shaped strap.

8. The apparatus of claim 5 wherein said strap includes a first aperture disposed at said first free end and a second aperture disposed at said second free end.

9. The apparatus of claim 8 wherein said lock device includes a first tip selectively insertable in said first aperture and a second tip selectively insertable in said second aperture.

10. The apparatus of claim 5 wherein said lock device is disposed between said first and second legs.

11. The apparatus of claim 1 wherein said lock device includes a portion moveable along a locking path between a first position wherein said first free end of said first strap is locked with respect to one of said first and second steering column members and a second position wherein said first free end is unlocked with respect to said one of said first and second steering column members.

12. The apparatus of claim 11 wherein said locking path extends at least partially perpendicular to said strap.

13. The apparatus of claim 11 wherein said locking path extends at least partially perpendicular to said collapse path.

14. The apparatus of claim 11 wherein:
    said portion includes a follower surface; and
    said lock device includes an explosive charge in communication with said follower surface, wherein said explosive charge is operable to explode adjacent to said follower surface to move said portion along said locking path.

15. The apparatus of claim 14 wherein said explosive charge is disposed internally with respect to one of the first and second steering column members.

16. The apparatus of claim 14 wherein said explosive charge is disposed externally with respect to both of the first and second steering column members.

17. The apparatus of claim 11 wherein said second free end of said first strap is locked with respect to said one of said first and second steering column members when said portion is in said second position.

18. The apparatus of claim 17 wherein said portion includes a first tip and a second tip, wherein said follower surface being disposed between said first and second tips.

19. The apparatus of claim 18 wherein both of said first and second free ends are locked to the same of said first and second steering column members by said lock device.

20. The energy absorbing apparatus as set forth in claim 1 further comprising:
    said strap having an intermediate portion, a first leg and a second leg, wherein said intermediate portion extends between said first and second legs and is constructed and arranged to deform against said second steering column member during column collapse, and said first and second legs project in a common direction along said collapse path from said intermediate portion; and
    said lock device having a reciprocating portion having a first tip for releasably engaging said first leg to said first steering column member and an opposite second tip for releasable engaging said second leg to said first steering column member.

21. The energy absorbing apparatus set forth in claim 20 wherein only one of said first and second legs are fixed to said first steering column member at any given moment in time.

22. The energy absorbing apparatus set forth in claim 20 further comprising:
- a first aperture in said first leg;
- a second aperture in said second leg; and
- wherein said first tip is located in said first aperture when said first leg is fixed to said first steering column member and said second tip is retracted from said second aperture, and wherein said second tip is located in said second aperture when said second leg is fixed to said second steering column member and said first tip is retracted from said first aperture.

23. An apparatus comprising:
- first and second steering column members movable relative to one another along a collapse path;
- at least one anvil fixedly associated with one of said first and second steering column members;
- a strap extending along a bent path around said at least one anvil and having first and second free ends;
- a lock device operative in a first condition to restrain one of said first and second free ends of said strap with respect to one of said first and second steering column members and operative in a second condition to release said one of said first and second free ends of said strap;
- wherein said at least one anvil includes a plurality of anvils;
- wherein said plurality of anvils include first and second anvils fixedly associated with said first steering column member and a third anvil fixedly associated with said second steering column member; and
- wherein said third anvil is spaced closer to one of said first and second anvils relative to the other of said first and second anvils.

24. An energy absorbing apparatus comprising:
- first and second steering column members being movable relative to one another along a collapse path;
- a first anvil carried by said second steering column member;
- a strap extending around said first anvil and having first and second free ends;
- a lock device operative in a first condition to restrain said first free end with respect to said first steering column member and operative in a second condition to release said first free end in response to a pre-determined impact load condition during a vehicle collision;
- wherein the second free end is movable relative to both of said first and second steering column members at least when said lock device is in said first condition; and
- wherein said bent path changes in response to movement between said first and second steering column members.

25. A method of operating an energy absorbing apparatus for a collapsible steering column generally during a vehicle collision comprising the steps of:
- moving first and second steering column members relative to one another along a collapse path;
- fixedly associating at least one anvil with one of the first and second steering column members;
- extending a strap having first and second free ends along a bent path around the at least one anvil;
- locking one of the first and second free ends of the strap with respect to one of the first and second steering column members with a lock device operative in a first condition to restrain one of the first and second free ends of the strap with respect to one of the first and second steering column members and operative in a second condition to release the one of the first and second free ends of the strap in response to a pre-determined impact load condition during a vehicle collision; and
- wherein said locking step includes the step of selecting a rate of energy to be dissipated in response to said moving step by locking one of the first free end and the second free end with respect to the one of the first and second steering column members, wherein the rate of energy dissipated when the first free end is locked is different than the rate of energy dissipated when the second free end is locked.

26. The method of claim 25 wherein said locking step is performed before said moving step.

27. The method of claim 25 wherein said locking step includes the step of:
- selecting a direction of movement of the first strap along the bent path in response to said moving step by locking one of the first end and the second end with respect to the one of the first and second steering column members, wherein the direction of movement when the first end is locked is different than the direction of movement when the second end is locked.

* * * * *